Patented Dec. 2, 1941

2,265,118

UNITED STATES PATENT OFFICE 2,265,118

HYDROCOLLOID MOLDING COMPOSITION AND MATERIAL FOR USE THEREIN

Walter J. Van Rossem, West Los Angeles, Calif., assignor to Surgident, Ltd., Los Angeles, Calif., a corporation of California No Drawing. Application April 2, 1941, Serial No. 386,512

10 Claims. (Cl. 18—47)

This invention relates to molding compositions of the hydrocolloid type and pertains particularly to a hydrocolloid impression or molding material having improved strength in gel condition together with an advantageous behavior with respect to the setting of gypsum plaster brought in contact therewith in the reproduction of plaster models.

Hydrocolloid molding compositions are broadly known in the art and are characterized by being resilient solid gels at temperatures below normal human body temperature and by being capable of conversion to a sol condition at temperatures adjacent the boiling point of water. These gels are "reversible" in nature; i. e., they may be converted to the sol condition by heating, and may be cooled to gel condition in contact with the subject to be reproduced. Such gels should exhibit high strength characteristics and resistance to plastic flow when in the gel condition so that the gelled "impression" may be removed from the subject to be reproduced without causing a permanent deformation of the impression during the removal operation, whereby faithful reproductions may be obtained. The principal constituent employed in such impression compositions is a reversible gel-forming hydrocolloid, such as agar-agar, Irish moss, or Iceland moss, which, when made up in water, will furnish a gel. These plain, unmodified gels have little strength and will fracture under the deformation customarily encountered in molding practice, such as in the dental art.

For dental use, which ordinarily is the most demanding art, the hydrocolloid impression composition should have five distinct properties, in all of which simple agar-agar gels are deficient to a greater or lesser extent. These properties may be listed and identified as follows:

(a) *Toughness:* Toughness may broadly be defined as the resistance which the gel exhibits to fracture under compressive load;

(b) *Hardness:* Hardness may be broadly defined as the resistance which the gel material offers to deformation under a given compressive load;

(c) *Low permanent set:* The permanent set which a gel material takes under the application of compressive stresses may be defined as the amount of plastic flow which the material will exhibit under a given loading;

(d) *Body development:* This property may be defined as the characteristic which the material exhibits in cooling from the sol condition toward the gel point, wherein the fluidity of the mass gradually decreases prior to actual solidification;

(e) *Minimum plaster-set effect:* This property is concerned with the behavior of the material toward dental grade gypsum plaster, i. e., whether the plaster cast reproduced from an impression or mold of the hydrocolloid will exhibit a hard and glassy, a powdery, or a soft surface, the former being particularly desirable.

The most desirable dental impression composition is one which will have a high toughness, a high hardness, a high resistance to permanent set, a significant body development on cooling, and the minimum adverse effect upon the setting of plaster. It has heretofore been suggested that increased toughness could be obtained by the addition of a borate-containing compound, but it has uniformly been found that the addition of such compound adversely affects the hardness, the permanent set, and the plaster effect; it has heretofore been proposed that the hardness of the compositions could be improved by the addition of waxy or resinous agents, but this expedient has usually resulted in a lowered resistance to permanent set; the development of body has variously been secured by the provision of waxes and resins as above mentioned in connection with "hardness," with a corresponding detrimental effect upon the permanent set characteristics of the material, and the behavior of the impression composition with respect to dental plaster or gypsum has been controlled through the agency of a chemical additive, such as alum or an alkali metal sulphate. Furthermore, as disclosed in U. S. Patent No. 2,234,383 issued March 11, 1941, to Bennett Preble, a borate compound may be employed for the purpose of toughening an agar-agar or the like gel and the usually concommitant adverse plaster-set effect kept at a minimum if the pH value of the completed gel composition is kept within a pH range of 7.9 to 8.2. The Preble patent further teaches that a preferred borate compound is one having a low solubility in water. It has been found, however, that even when borate compounds of the lowest solubility are employed, and the preferred pH value is established, the behavior of the gel composition with respect to plasters is at best uncertain, and leaves much to be desired.

One of the particular objects of the present invention is to provide a hydrocolloid molding composition consisting essentially of an agar-agar or like hydrocolloid base, and containing an oxide or hydroxide of an amphoteric metal together with physico-chemical modifying agents which serve to impart to the composition all of the above-listed properties to a degree not hitherto attained in the art.

A further and particular object of the invention is to provide a single chemical additive composition which may be added directly to a hot sol of agar-agar in the production of an impression or molding composition of advantageous properties.

According to a preferred practice of my invention, I compound a chemical mixture containing an agent of the character represented by the oxides or hydroxides of amphoteric metals, such as, for example, tin, zinc, manganese and aluminum, which is buffered to a condition of slight alkalinity (preferably about pH8 to pH9), together with an insoluble finely divided inorganic filler material and/or a borate compound. The borate compound in the mixture may be one of low water solubility as taught by Preble above-mentioned, or may be one of high solubility such as potassium meta-borate, for example, and the finely divided inorganic filler material may be of the character of calcium sulphate or an insoluble carbonate such as calcium or magnesium carbonate. This chemical mixture is added to the heated agar-agar plus water, and thoroughly incorporated therein. The amount of the chemical mixture added to the agar-agar will be determined by the strength desired in the finished product, and if the chemical mixture is properly compounded the plaster-set characteristic of the finished product will be substantially perfect at all concentrations of the added material, within the operative upper and lower limits hereinafter recited.

As an illustrative example of the preparation of an improved hydrocolloid impression or molding composition according to this invention, the following materials may be compounded:

*Formula A*

Tin sulphate ($Sn(SO_4)_2 \cdot 2H_2O$) _____ grams__ 10
Calcium metaborate($Ca(BO_2)_2 \cdot 2H_2O$_gram__ 1
Potassium hydroxide (KOH)
                        grams (approx.)__ 9

In compounding the above ingredients, the tin sulphate is dissolved in about 40–50 cc. of water, and the calcium metaborate added thereto, either directly or in solution in about 5 cc. of glycerine; the KOH is added slowly, as a 50% KOH solution in water for example, preferably in the presence of phenolphthalein as an indicator, to a fair purple color. This establishes a pH in the neighborhood of 9.

The above mixture is added to a melt of:

Agar-agar (Kobi #1 strip) _____ grams__ 30
Water _____ cc. (approx.)__ 120

The mixture is added slowly, under constant stirring and heating, and the agar-agar mix gradually becomes stiffer as more of the chemical mixture is added. If the mixture is added too rapidly, the batch will become "liver-like" and cannot be handled. After the desired quantity of the mixture has been added, water is added to bring the final volume of the composition to 200 cc.

The physical properties of the final composition are dependent upon the amount of the above chemical mixture added to the agar-agar. If about one-fourth of the above mixture is added, the resulting material is most suitable in dental use for general full-mouth impressions; if one-half of the mixture is added the resulting material is most suitable for inlay and fixed bridge work, the gel point is not greatly different from straight agar-agar gels, and the reproduction fidelity of the material is very good (within 0.0001 inch between one inch centers, based on preparation of a plaster positive of "Hydrocal 105" or "Hydrocal 106," having an expansion of 0.15% upon setting).

If the full amount of the chemical mixture is added, the resulting composition is very tough, and is particularly useful as in immediate dental restorations where a great deal of tissue compression is desired. The time required to produce a complete gelling of this material is somewhat greater than for the two compositions above described, but where an efficient cooling tray is employed and cooling water of not over 50° is used, the final set can be obtained in a full mouth impression within five minutes.

Numerous substitutions can be made in the above chemical mixture formula without materially affecting the desirable physical properties of the final composition. For example, zinc or aluminum sulphate may be substituted in stoichiometric equivalency to the tin sulphate, and good results can be secured with manganese sulphate. When manganous sulphate is employed I prefer to subject the composition to atmospheric or chemical oxidation, which causes the agar-agar mixture to turn quite dark owing to the oxidation of the manganese ion. This color change may be esthetically detrimental for some uses of the material, but better plaster-set characteristics are obtained. Similarly, if manganous borate be substituted for the calcium borate, the atmospheric or chemical oxidation is desirable. A soluble borate (such as potassium meta-borate, for example) may be substituted for the calcium borate in the above formula, if desired, with a corresponding reduction in the amount of alkali employed. Boric acid may also be substituted, with a corresponding increase in the alkali, and preferably with an increase in the proportion of the colloidal metallic oxide or hydroxide.

The proportions of borate and alkali metal hydroxide in Formula A may be materially varied. For example, the calcium borate may be varied between 0.20 g. and 2.0 g., and the alkali metal hydroxide may be varied between the stoichiometric equivalent of the tin sulphate to a value much in excess thereof. More specifically, I have been able to vary the KOH from about 6.5 g. to as high as 11.2 g. In general, with a given amount of borate, the greater the quantity of alkali the greater the toughness. When a relatively high proportion of borate is employed, I prefer to use a relatively low proportion of alkali, and conversely, when a relatively low proportion of borate is employed I prefer to use a relatively high proportion of alkali. This relation is not essential, however, inasmuch as Formula A may be compounded with the minimum proportions of both borate and alkali, and a greater proportion of the formula used in the agar-agar mixture, with excellent results.

When compared to previously suggested forms of agar-agar impression or molding compositions, the plaster-set behavior of the agar-agar composition modified with the above chemical mixture is quite striking. Agar-agar itself is believed to contain a material which is detrimental to the setting of gypsum plaster, and when a borate-containing compound or reagent is incorporated in the agar-agar composition to secure an increase in toughness, the plaster-set characteristics of the material are even worse. When gypsum plaster is cast against a pattern made of the unmodified hydrocolloid, the surface of the resulting plaster model is usually soft and crumbly, wholly unlike the surface obtained when the plaster is cast against a good surface such as glass. Furthermore, if the surface of the unmodified hydrocolloid is wet, as is frequently the case owing to the difficulty of wiping the surface of an intricate pattern, the resulting plaster cast is particularly bad. An agar-agar hydrocolloid modified with the chemical mixture as described above not only gives a plaster cast having a practically perfect surface, comparable to that obtained when the plaster is cast against glass, but this plaster set is obtained in much less than the time usually considered necessary. For example, with plaster having a "normal" setting time of 15 minutes, it has hitherto been found necessary to keep the plaster in contact with an unmodified hydrocolloid mold for at least 30 minutes to get a good "set" to the plaster, while with the present composition a good set is obtained very close to "normal" setting time of 15 minutes, and a complete set may be obtained within 20 minutes. Furthermore, a good surface is obtained even on wet patterns.

It is believed that the desirable properties are obtained in the compositions of the present invention by the provision of the colloidal oxide or hydroxide agent, which may have an adsorbent action on the free borate ions present in the composition and/or upon the plaster-set inhibiting matter in the agar-agar itself. In Formula A above, both the borate compound and the insoluble filler material are present, the filler material being $CaSO_4.2H_2O$ formed by the sulphate ion of the tin sulphate and the calcium ion of the calcium borate. This insoluble inorganic filler material appears to function as nuclear particles for the agglomeration of the oxide or hydroxide floc produced by the amphoteric metal and the alkali, materially increasing the effectiveness of such oxide or hydroxide. As an illustration of the effect of such insoluble filler material, I may add from 2 to 4 grams or more, for example, of a finely divided material such as precipitated calcium carbonate, magnesium carbonate or calcium sulphate, or the like, to Formula A, and reduce the alkali addition 50% or more. This results in a lowered pH (materials as low as pH 7.0 having been found useful) and the hardness is increased markedly without undue loss of toughness. Such low pH materials find their most particular utility in such techniques as those of porcelain jacket and baked porcelain bridge-work, where great hardness is a prerequisite.

The presence of the potassium sulphate probably also exerts a beneficial effect on the plaster-set, the behavior of this compound in this respect being well known. I have determined, however, that the presence of an appreciable amount of potassium sulphate is not essential however, and good results can be obtained in the substantial absence thereof. For example, I may compound the following:

Formula B

| | |
|---|---|
| $Ca(BO_2)_2.2H_2O$ | 1–2 grams |
| Aqueous $Sn(OH)_4$ suspension ($27+\%Sn(OH)_4$) | 20 grams |
| KOH | q. s. to give pH 8–9 |

The above ingredients are compounded as in Formula A, the calcium borate being preferably used in solution in 5 cc. of glycerine and thoroughly mixed with the tin hydroxide. The mixture requires but a few drops of 50% KOH solution. It will be apparent that no inorganic filler is present in this formula. A good plaster set is obtained when the above composition is incorporated with 30 grams of agar-agar and made up to 200 cc.

In the Formula A above, the presence of the sulphate ion of the tin compound will cause the formation of some calcium sulphate by reaction with the calcium borate (calcium sulphate being the more insoluble compound) as above pointed out and in order to make Formula B more comparable to Formula A (except for the $K_2SO_4$) I may make a new formula, Formula C, by adding one gram of finely precipitated $CaSO_4.2H_2O$ to Formula B. Formula C, when added to agar-agar as above gives a very good plaster set, even in wet corners of the pattern. The addition of 5 grams of $K_2SO_4$ to Formula C gave no material improvement.

The metallic hydroxide may be formed in the composition by precipitation with an alkali, as in Formula A, or may be added in precipitated condition as in Formula B. I have found, however, that better results are obtained when the hydroxide is formed by precipitation from an acid medium than from an alkaline medium. For example, $Sn(OH)_4$ prepared by precipitation with an alkaline alkali metal compound, such as KOH, NaOH, $K_2CO_3$, $KHCO_3$, $Na_2CO_3$, $NaHCO_3$, or the like, from $Sn(SO_4)_2$ or $SnCl_4$ solution is, at the present time, believed more effective in the composition than that prepared by precipitation, for example, with $H_2SO_4$ from a solution of $K_2SnO_3.3H_2O$. The known "polar" characteristics of these metallic "gel" hydroxides may be of importance in this connection. An effective precipitated metallic hydroxide may be prepared, for example, by aqueous interaction between $SnCl_4.5H_2O$ and $NaHCO_3$, in the proportions of 3.505 grams to 3.16 grams, washing the precipitate by plural decantation with water, followed by filtration, to remove the soluble chloride. This precipitate keeps well in glass-stoppered containers and functions perfectly in the compositions.

The metallic hydroxide may be incorporated in the composition in "peptized" condition, if desired, without detriment; for example, a suspension of precipitated $Sn(OH)_4$ is treated with a few drops of a 50% KOH solution until a "peptized" condition is produced, and this peptized gel incorporated in the chemical mixture.

As a further example of the invention, providing a composition formula in which little or no borate is required, I may compound the following:

Formula D

| | Grams |
|---|---|
| $ZnSO_4.7H_2O$ | 10 |
| $CaCO_3$ (precipitated) | 5 |
| $Ni(NO_3)_2.6H_2O$ | 1 |
| KOH (as a 50% aq. solution) about | 4.5 |
| $Ca(BO_2)_2.2H_2O$ | 0.2 |

The zinc sulphate, in solution, together with the precipitated calcium carbonate and the nickelous nitrate, is titrated to a good pink color with the KOH, requiring about 6 ccs of a 50% solution of such hydroxide. The calcium borate may then be added. This combination may be added to a hot agar-agar sol containing 30 g. agar-agar, and the whole diluted with water to a final volume of approximately 200 ccs. The final product is very tough and hard, and gives an admirable plaster set. The nickelous nitrate acts to harden the agar-agar, and ferric nitrate may be substituted therefor with substantially full equivalence except for the color of the final product, which is somewhat objectionably dark when the iron compound is employed. The formula contains but a nominal amount of borate (about $\frac{1}{16}$ of 1%), and even this small amount may be omitted, if desired, without complete loss of the high toughness of the material. The relatively large quantity of the inorganic filler material (precipitate calcium carbonate) seems to function perfectly as an insoluble nucleus for the metallic oxide or hydroxide floc, and further appears greatly to benefit the behavior of the final molding composition with respect to its "working" qualities in sol condition. In particular, the above combined agar-agar molding composition is readily susceptible to dilution by the user, as by the addition of hot water to the composition in sol condition, making a smooth diluted material, where ordinarily considerable difficulty is experienced with agar-agar compositions of the prior art when such dilution is attempted. It will be appreciated that other amphoteric oxides or hydroxides may be formed or used in this formula, as the use of the zinc compound is not critical; similarly other borates, water insoluble or water soluble, may be employed, if desired, without adverse effect.

As a preferred composition for full-mouth dental impression material, embodying great toughness, a high hardness, a very low permanent set, good body development, amenability to dilution, and plaster-set characteristics such that gypsum patterns have the appearance of having been cast against polished glass, I may compound the following:

Formula E (a) $CaCO_3$ (pptd.) __ 2 g.
(b) $ZnSO_4.7H_2O$ ____ 4 g.
(c) $MgSO_4.7H_2O$ ____ 2 g.
(d) Water_____ q. s. to dissolve (b) and (c)
(e) KOH (50% $H_2O$
    solution) _____ 2.5 cc. (approx.)
(f) $Ca(BO_2)_2.2H_2O$
    (in 5 cc.
    glycerine) ____ 0.75 g.
(g) $K_2SO_4$_____ 2 g.
(h) Antiseptic_____ q. s.
(i) Flavoring_____ q. s.
(j) Agar-agar (#1
    Kobi strip) ___ 30 g.
(k) Water_____ q. s. to 200–250 cc.

The items (a) through (g) are preferably compounded separately, and added to a melted agar-agar solution as above described. It will be noted that a relatively small amount of KOH is employed in the above formula. The pH of this composition will be approximately 7.5. The $ZnSO_4$ furnishes the amphoteric metal hydroxide, and the $MgSO_4$ acts to react with the portion of KOH which is added in excess of that required to react with the $ZnSO_4$, so that the addition thereof is not critical. The reaction product of $MgSO_4$ and KOH is $Mg(OH)_2$ which acts like a filler material, and any nominal excess or residual quantity of $MgSO_4$ which may remain in the mixture is non-detrimental as long as some insoluble filler material is present. It will also be noted that the proportion of borate compound present in the final composition is quite small.

As a further modification of the chemical mixture I may prepare the following composition:

Formula F $Ca(BO_2)_2.2H_2O$_____ 2 g.
$(NH_4)_2SO_4$_____ 4 g.
Aqueous $Sn(OH)_4$ suspension
 (27+% $Sn(OH)_4$)_____ 10–20 g.
KOH_____ q. s. to pH 8–9

The calcium borate (plain or dissolved in about 5 ccs glycerine) is mixed with water to a dilution of about 40 ccs. The $(NH_4)_2SO_4$ is then added. This causes a conversion of part of the calcium borate to calcium sulphate, freeing a corresponding proportion of borate radical. The tin hydroxide may then be added together with some KOH and the mixture is heated to drive off $NH_4OH$. The balance of the KOH may be added gradually until an end pH of 8–9 is obtained. The substantially complete elimination of the $NH_4OH$ is necessary, inasmuch as the presence of $NH_4OH$ in the final agar-agar mixture is quite detrimental, causing a sponginess which materially detracts from the strength characteristics of the composition.

A somewhat better hardness in the final agar-agar composition may be obtained by a slight modification of the above procedure for compounding Formula F; for example, it has been found that when an ammonium compound is employed, the metallic hydroxide is preferably added last, after all the $NH_4OH$ is driven off. If the composition is compounded by the procedure given under the formula, the requisite quantity of the alkali will be known, and the procedure may then be modified by adding the entire quantity of the alkali before addition of the tin hydroxide, heating to drive off the $NH_4OH$, and adding the tin hydroxide thereafter. This apparently avoids the adsorption of $NH_4$ ions by the amphoteric hydroxide, with some benefit to the completed agar-agar composition.

Furthermore, it may be pointed out that the use of a glycerine solution for the alkaline earth metal borate or manganous borate is primarily for the purpose of securing a more highly dispersed condition of the borate in the composition. When a freshly precipitated insoluble borate is employed, it may readily be dispersed in the composition. Such precipitated insoluble borate may be prepared by aqueous reaction of $CaCl_2$ and $Na_2B_2O_7 \cdot 10H_2O$, the precipitate being washed well by decantation and/or filtration. This precipitate may be directly employed, without drying.

It also has been found that the individual ingredients of Formulae A, B, C, D or E may be added directly to the agar-agar mix, rather than being compounded separately and added as a mixture. When added separately, however, great caution must be exercised in the addition of the reagents, as, for example, if tin sulphate is employed the addition of an excessive amount thereof at one time might swing the pH of the agar-agar solution strongly to the acid side, causing a hydrolysis thereof which cannot be remedied.

Care must also be exercised in the addition of the alkali and a variable but markedly smaller quantity is required. For example, in Formula A, if but one-half of the indicated quantity of the KOH is compounded in the chemical mixture, the mixture added to the agar-agar, and the balance of the KOH then added to the agar-agar mix the material will be tougher but the plaster set will be bad. Furthermore, the material so compounded will turn a dark chocolate color. When the required amount of KOH is preliminarily compounded with the borate and metallic hydroxide, however, the color of the agar-agar is not altered materially and good plaster-set behavior is secured.

A further modification of the compounding of the physico-chemical modifying agents with the agar-agar may be employed, as by making up any of Formulae A through E in a small amount of dilute agar-agar solution, and then adding that solution or mixture to the main body of agar-agar solution. For example, in preparing a 200 gram quantity of agar-agar impression composition, I may compound the ingredients of any of said Formulae A to E in about 50 ccs. of a 2% agar-agar solution, and then add the resulting mixture to about 120 ccs. of an agar-agar solution containing about 29 grams of agar-agar, and making the final composition up to volume. The preliminary incorporation of the physico-chemical modifying agents in the dilute agar-agar solution appears to facilitate the formation of a better "floc" of the insoluble constituents of the composition, contributing to the sol properties of the final composition, and, further, the final composition will not "liver up" during addition of the dilute agar-agar mixture, which materially contributes to the ease of commercial compounding of the molding materials.

It will be appreciated that the proportions of the various physico-chemical modifying agents may be varied in any of the formulae after the manner generally described in connection with Formula A in particular.

In any case the amount of borate-containing compound or reagent will be materially less than the metallic hydroxide used, wherefore the chemical mixture added to the agar-agar may be considered to consist principally of a dispersion of the metallic hydroxide.

I claim:

1. A composition adapted for addition to a hydrocolloid of the agar-agar type for improvement of the physical characteristics of such hydrocolloid for molding purposes, which comprises: a slightly alkaline aqueous dispersion of a hydroxide of an amphoteric metal and including a borate-containing reagent in an amount less than the amount of said hydroxide.

2. A composition adapted for addition to a hydrocolloid of the agar-agar type for improvement of the physical strength and plaster-set characteristics of such hydrocolloid, which comprises: a slightly alkaline aqueous dispersion consisting principally of a metallic hydroxide precipitated from acid solution of a salt of such metal by the addition of an alkaline compound of an alkali metal and including a borate-containing reagent.

3. A composition adapted for addition to a hydrocolloid of the agar-agar type for improvement of the physical strength and plaster-set characteristics of such hydrocolloid, which comprises: an aqueous dispersion of stannic hydroxide formed by precipitation from an aqueous solution of a stannic salt by the addition of an alkaline compound of an alkali metal, and including a borate-containing reagent in an amount less than said hydroxide, said aqueous dispersion having an alkaline pH not in excess of about pH 9.

4. A composition adapted for addition to a hydrocolloid of the agar-agar type for improvement of the physical strength and plaster-set characteristics of such hydrocolloid, which comprises: an aqueous slightly alkaline dispersion of stannic hydroxide formed by precipitation from an aqueous solution of stannic sulphate by the addition of potassium hydroxide, and including a borate-containing reagent in an amount less than said hydroxide, the alkalinity af said aqueous dispersion being not in excess of about pH 9.

5. A composition adapted for addition to a hydrocolloid of the agar-agar type for improvement of the physical characteristics of such hydrocolloid for molding purposes which comprises a slightly alkaline aqueous dispersion of a hydroxide of an amphoteric metal and including a finely divided water-insoluble inorganic filler material.

6. A composition adapted for addition to a hydrocolloid of the agar-agar type for improvement of the physical strength and plaster-set characteristics of such hydrocolloid, which comprises: a slightly alkaline aqueous dispersion consisting principally of an amphoteric metallic hydroxide precipitated from acid solution of a salt of such metal by the addition of an alkaline compound of an alkali-metal, and including a borate-containing reagent and a finely-divided water-insoluble inorganic filler material.

7. A hydrocolloid molding composition containing about 15% agar-agar, from 0.1% to 1% of a borate-containing reagent, and from about 1% to 5% of a hydroxide of an amphoteric metal, said composition having an alkaline pH not in excess of about 8.5.

8. A hydrocolloid molding composition containing about 15% agar-agar, from 0.1% to 1% of a borate-containing reagent, from about 1% to 5% of a hydroxide of an amphoteric metal and about 2% of a finely divided water-insoluble inorganic filler material, said composition having an alkaline pH not in excess of about 8.5.

9. A hydrocolloid molding composition containing about 15% agar-agar, from 0.1% to 1% of a borate-containing reagent, and from about 1% to 5% of a hydroxide of an amphoteric metal, said hydroxide being formed by precipitation upon addition of an alkaline compound of an alkali metal to an acidic solution of a salt of such amphoteric metal, and having been incorporated in said hydrocolloid in precipitated condition.

10. A hydrocolloid composition containing about 15% agar-agar, from 0.1% to 1% of a borate-containing reagent, about 2% of a finely divided water-insoluble inorganic filler material, and from about 1% to 5% of a hydroxide of an amphoteric metal, said hydroxide being formed by precipitation upon addition of an alkaline compound of an alkali metal to an acidic solution of a salt of such amphoteric metal, and having been incorporated in said hydrocolloid in precipitated condition.

WALTER J. VAN ROSSEM.